United States Patent
Liang

(10) Patent No.: US 10,193,946 B2
(45) Date of Patent: Jan. 29, 2019

(54) METHOD FOR DOWNLOADING MULTIMEDIA FILE AND ELECTRONIC DEVICE

(71) Applicant: Acer Incorporated, New Taipei (TW)

(72) Inventor: Sheng-Yu Liang, New Taipei (TW)

(73) Assignee: Acer Incorporated, New Taipei (TW)

(*) Notice: Subject to any disclaimer, the term of this patent is extended or adjusted under 35 U.S.C. 154(b) by 145 days.

(21) Appl. No.: 15/284,203

(22) Filed: Oct. 3, 2016

(65) Prior Publication Data
US 2017/0111419 A1 Apr. 20, 2017

(30) Foreign Application Priority Data
Oct. 20, 2015 (TW) .............................. 104134357 A

(51) Int. Cl.
*G06F 15/16* (2006.01)
*H04L 29/06* (2006.01)
*H04L 29/08* (2006.01)

(52) U.S. Cl.
CPC .......... *H04L 65/601* (2013.01); *H04L 65/602* (2013.01); *H04L 65/80* (2013.01); *H04L 67/06* (2013.01); *H04L 67/104* (2013.01)

(58) Field of Classification Search
CPC ...... H04L 65/601; H04L 67/104; H04L 67/06
USPC ......................................................... 709/219
See application file for complete search history.

(56) References Cited

U.S. PATENT DOCUMENTS 8,850,055 B1 * 9/2014 Mani ................. G06F 17/30017
709/231
2010/0306373 A1 * 12/2010 Wormley ............ H04L 67/1029
709/224

FOREIGN PATENT DOCUMENTS

TW 200833028 8/2008

* cited by examiner

*Primary Examiner* — Wing F Chan
*Assistant Examiner* — Joseph R Maniwang
(74) *Attorney, Agent, or Firm* — J.C. Patents

(57) ABSTRACT

A method for downloading multimedia files and an electronic device are provided. The method includes: obtaining first bandwidth information of a first electronic device; calculating a first times point according to the first bandwidth information; sending a first download request to the first electronic device to request downloading a first multimedia streaming prior to the first time point in the multimedia file; and sending a second download request to a second electronic device to request downloading a second multimedia streaming posterior to the first time point in the multimedia file.

10 Claims, 5 Drawing Sheets

METHOD FOR DOWNLOADING MULTIMEDIA FILE AND ELECTRONIC DEVICE

CROSS-REFERENCE TO RELATED APPLICATION

This application claims the priority benefit of Taiwan application serial no. 104134357, filed on Oct. 20, 2015. The entirety of the above-mentioned patent application is hereby incorporated by reference herein and made a part of this specification.

BACKGROUND

Field of the Invention

The invention relates to a method for sharing files, and particularly relates to a method for downloading a multimedia file and an electronic device.

Description of Related Art

In a private cloud environment, an electronic device may play multimedia files such as photos, music, videos, etc., on a cloud device through network streaming. Generally, if the multimedia files are downloaded from a fixed cloud device, a download speed and a streaming playing efficiency of the multimedia file are limited by a bandwidth and performance of the cloud device.

Although a method for downloading the multimedia files from a plurality of remote devices has been provided, the method does not optimize share of the multimedia files in the private cloud environment. Moreover, a present peer to peer (P2P) transmission mechanism cannot adjust a download rule of one multimedia file according to a network environment or system performance of the source ends.

SUMMARY OF THE INVENTION

The invention is directed to a method for downloading multimedia files and an electronic device, which enhances efficiency for downloading the multimedia files.

An embodiment of the invention provides a method for downloading a multimedia file, which is adapted to an electronic device. The method includes following steps. First bandwidth information of a first source device is obtained. A first time point is calculated according to the first bandwidth information. A first download request is sent to the first source device to request downloading a first multimedia streaming prior to the first time point in the multimedia file. A second download request is sent to a second source device to request downloading a second multimedia streaming posterior to the first time point in the multimedia file.

Another embodiment of the invention provides an electronic device including a network interface card, a storage medium and a processor. The storage medium is configured to store a plurality of modules. The processor is coupled to the storage medium and configured to load and execute the modules to implement following operations: connecting to a first source device and a second source device through the network interface card; obtaining first bandwidth information of the first source device; calculating a first time point according to the first bandwidth information; sending a first download request to the first source device through the network interface card to request downloading a first multimedia streaming prior to the first time point in a multimedia file; and sending a second download request to the second source device through the network interface card to request downloading a second multimedia streaming posterior to the first time point in the multimedia file.

According to the above description, the electronic device intended to download a certain multimedia file may determine at least one time point in the multimedia file according to bandwidth information of at least one electronic device capable of sharing the multimedia file. The multimedia file is divided into a plurality of parts according to the time point, and is respectively downloaded from the corresponding electronic devices, so as to increase download efficiency and streaming playing performance of the multimedia file.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
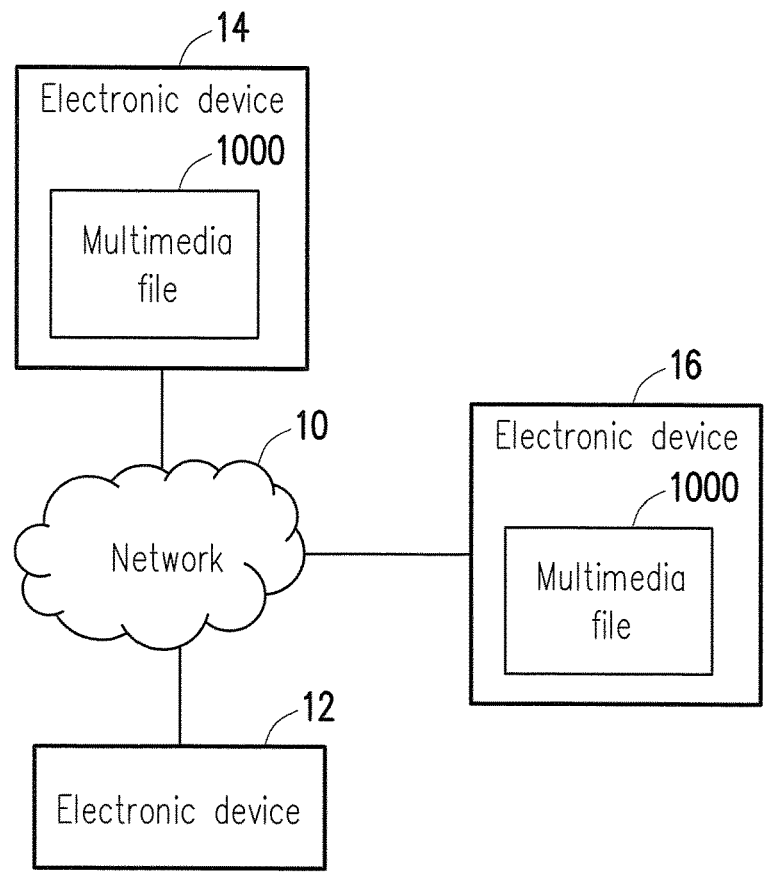
FIG. 1 is a schematic diagram of a multimedia file download system according to an embodiment of the invention.

FIG. 1 is a schematic diagram of a multimedia file download system according to an embodiment of the invention.

Referring to FIG. 1, the multimedia file download system 100 includes a network 10, an electronic device 12, an electronic device 14 and an electronic device 16.

In the present embodiment, the electronic deice 14 is a cloud server. The cloud server can be a server host (for example, a personal computer (PC)) set up by a user or a network hard disk drive provided by a cloud service provider (for example, Google). The amount of the electronic devices 14 is not limited by the invention.

In the present embodiment, the electronic devices 12 and 16 are respectively electronic devices belong to one or a plurality of users. For example, the electronic devices 12 and 16 can be respectively an electronic device having data transmission and storage functions such as a smart phone, a tablet PC, a notebook, a desktop computer, etc.

One or a plurality of multimedia files 1000 can be backed up or stored in at least one of the electronic devices 12, 14 and 16. The aforementioned multimedia file 1000 can be an image file, a sound file or a combination file of image and sound, etc. The electronic devices 12 and 16 may download the multimedia file 1000 from the electronic device 14 or upload the multimedia file 1000 to the electronic device 14. The electronic devices 12 and 16 may transmit the multimedia file 1000 to each other.

In the present embodiment, a registration list of the electronic device 14 records registration information of the electronic devices 12 and 16. For example, the registration information includes at least one of an Internet protocol (IP) address, a media access control (MAC) address, device model information and device owner information (for example, a name, account and/or password of the owner, etc.). Alternatively, the registration list may further record any useful information, and is not limited to the aforementioned information. According to the registration list, when the electronic device 12 or 16 wants to connect to the electronic device 14 or executes file transmission, the electronic device 14 may verify an identity of the electronic device 12 or 16. Moreover, the electronic device 12 or 16 may log in the electronic device 14 by using a same or respectively user account to access a service provided by the electronic device 14. Such service includes any network service, for example, online storage and download of the multimedia file or sharing of the multimedia file to other users, etc. Alternatively, in another embodiment, the electronic devices 14 and 16 may belong to a same cloud server, and may provide a download service of a same multimedia file in parallel.

In another embodiment, the electronic devices 12, 14 and 16 can be respectively an electronic device having the data transmission function and the storage function such as a smart phone, a tablet PC, a notebook, a desktop computer, etc., that belongs to a same or different users. In this way, the multimedia file 1000 can be backed up, stored and transmitted between any of the electronic devices 12, 14 and 16.

The electronic devices 12, 14 and 16 are connected through the network 10. In the present embodiment, the network 10 is a wired/wireless local area network (LAN). For example, the wired LAN may refer to a private domain. For example, the wireless LAN may refer to wireless fidelity (WiFi). The wired/wireless LAN may cover a family, a school or a company (department), etc., which is determined according to a layout of a transmission line and/or a signal intensity. However, in another embodiment, the network 10 can also be any wired/wireless network. For example, the wireless network may refer to a $3^{rd}$-generation (3G) mobile communication standard or a long term evolution (LTE) standard, etc.

In the present embodiment, if the electronic device 12 wants to download the multimedia file 1000 from the electronic device 14 and the electronic device 16 also stores such multimedia file 1000, the electronic device 12 can be regarded as a local electronic device, and the electronic devices 14 and 16 are respectively regarded as a source device. For example, the electronic device 14 is regarded as a first source device, and the electronic device 16 is regarded as a second source device. The electronic device 12 may respectively download different parts of the multimedia file 1000 from the electronic devices 14 and 16.

In the present embodiment, the electronic device 12 may obtain bandwidth information (which is referred to as first bandwidth information hereinafter) of the electronic device 14. For example, the first bandwidth information indicates a data amount transmitted by the source device 14 per second through a network interface thereof. For example, the first bandwidth information may include a wired or wireless transmission bandwidth of the electronic device 14. Moreover, in another embodiment, the first bandwidth information may also include any channel information that influences the data transmission between the electronic device 12 and the electronic device 14 such as quality of a wired/wireless transmission channel between the electronic device 12 and the electronic device 14, a noise interference degree or a signal intensity, etc.

In the present embodiment, the electronic device 12 may determine a time point (which is referred to as a first time point hereinafter) according to the first bandwidth information. For example, if the first bandwidth information indicates that a transmission bandwidth of the electronic device 14 for transmitting the multimedia file 1000 is large, a transmission speed thereof is fast, a transmission time thereof is short, a channel quality thereof is good and/or a channel noise interference thereof is weak, etc., the first time point is set to be farther from a start time point of the multimedia file 1000; and if the first bandwidth information indicates that a bandwidth for downloading the multimedia file 1000 from the electronic device 14 to the electronic device 12 is smaller, a transmission speed thereof is slow, a transmission time thereof is long, a channel quality thereof is poor and/or a channel noise interference thereof is strong, etc., the first time point is set to be closer to the start time point of the multimedia file 1000.

For example, it is assumed that a file size of the multimedia file 1000 is 700 megabytes (MB), and a total playing time (which is also referred to as a time length of the multimedia file hereinafter) of the multimedia file 1000 is 60 minutes, the start time point of the multimedia file 1000 refers to a time point at 0 minute 0 second in the total playing time of the multimedia file 1000 (i.e. a file start time of the multimedia file 1000), and an end time point of the multimedia file 1000 refers to a time point at 60 minutes 60 seconds in the total playing time of the multimedia file 1000 (i.e. a file end time of the multimedia file 1000).

After the first time point is obtained, the electronic device 12 sends a download request (which is also referred to as a first download request hereinafter) to the electronic device 14. The first download request is to request downloading a multimedia streaming (which is also referred to as a first multimedia streaming hereinafter) prior to the first time point in the multimedia file 1000. Moreover, the electronic device 12 also sends another download request (which is also referred to as a second download request hereinafter) to the electronic device 16. The second download request is to request downloading a multimedia streaming (which is also referred to as a second multimedia streaming hereinafter) posterior to the first time point in the multimedia file 1000.

Figure 2:
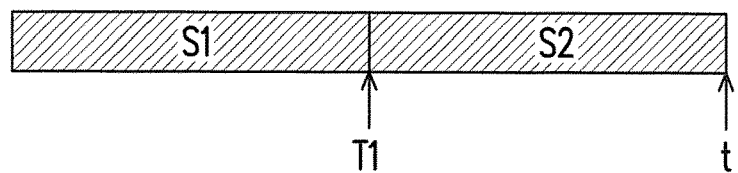
FIG. 2 is a schematic diagram of downloading a multimedia file in segments according to an embodiment of the invention.

FIG. 2 is a schematic diagram of downloading a multimedia file in segments according to an embodiment of the invention.

Referring to FIG. 2, it is assumed that the total playing time of the multimedia file 1000 is t. In response to the first download request, the electronic device 14 transmits the first multimedia streaming prior to a time point T1 in the multimedia file 1000 to the electronic device 12. For example, the electronic device 14 transmits a multimedia streaming S1 between the file start time and the time point T1 in the multimedia file 1000 to the electronic device 12. In response to the second download request, the electronic device 16 transmits the second multimedia streaming posterior to the time point T1 in the multimedia file 1000 to the electronic device 12. For example, the electronic device 16 transmits a multimedia streaming S2 between the time point T1 and the time point t (i.e. the file end time) in the multimedia file 1000 to the electronic device 12. By synchronously downloading the multimedia streamings S1 and S2 from the electronic devices 14 and 16, the electronic device 12 may accelerate a download speed of the multimedia file 1000.

In an embodiment, in response to the first download request, the electronic device 14 may provide device information of other electronic devices (for example, the electronic device 16) also storing the multimedia file 1000 to the electronic device 12. For example, the electronic device 14 may inquire a historic list to obtain a download record of the electronic device 16 for the multimedia file 1000. According to the download record, the electronic device 14 may transmit the device information of the electronic device 16 to the electronic device 12 according to the aforementioned registration list. According to the device information of the electronic device 16, the electronic device 12 may transmit the second download request to the electronic device 16. For example, the device information may include at least one of an IP address, a MAC address, device model information and device owner information (for example, a name, account and/or password of the owner, etc.).

In the present embodiment, the electronic device 12 may decode and play the received multimedia streaming in real-time. The multimedia streaming that is not yet played is cached in a buffer of the electronic device 12. The buffer of the electronic device 12 can be any storage medium such as a volatile memory, a non-volatile memory, or a hard disk drive (HDD), etc. For example, the electronic device 12 may decode and play the downloaded first multimedia streaming in real-time, and in background, a part of the downloaded first multimedia streaming that is not yet played and the pre-downloaded second multimedia streaming are cached in the buffer of the electronic device 12. After play of the first multimedia streaming is completed, the electronic device 12 consecutively decodes and plays the second multimedia streaming in the buffer of the electronic device 12.

In other words, it is assumed that the electronic device 12 is playing a certain multimedia file provided by a an online video platform (for example, youtube), the multimedia streaming prior to the first time point in the multimedia file is probably provided by the online video platform (for example, the electronic device 14), and the multimedia streaming posterior to the first time point in the multimedia file is probably provided by other electronic devices (for example, the electronic device 16) also storing such multimedia file. However, in another embodiment, the electronic device 12 does not play the downloaded multimedia streamings in real-time, but stores the downloaded multimedia streamings in a storage medium such as a non-volatile memory or a HDD, etc. In this way, the user may read and play the multimedia file composed of the downloaded multimedia streamings from the storage medium such as the non-volatile memory or the HDD, etc., of the electronic device 12 at any time.

In an embodiment, the electronic device 12 may further obtain bandwidth information (which is referred to as second bandwidth information hereinafter) of the electronic device 16. For example, the second bandwidth information indicates a data amount transmitted by the electronic device 16 per second through a network interface thereof. Similar to the first bandwidth information, the second bandwidth information may also include any information related to transmission of the multimedia streaming from the electronic device 16 to the electronic device 12. After the second bandwidth information is obtained, the electronic device 12 may also obtain the aforementioned first time point according to the second bandwidth information.

It should be noted that compared to the first bandwidth information, if the second bandwidth information indicates that a bandwidth for downloading the multimedia file 1000 from the electronic device 16 to the electronic device 12 is larger, a transmission speed thereof is faster, a transmission time thereof is shorter, a channel quality thereof is better and/or a channel noise interference thereof is weaker, etc., the first time point is probably set to be closer to the start time point of the multimedia file 1000; and if the second bandwidth information indicates that a speed for downloading the multimedia file 1000 from the electronic device 16 to the electronic device 12 is slower, a transmission time thereof is longer, a channel quality thereof is poorer and/or a channel noise interference thereof is stronger, etc., the first time point is probably set to be farther to the start time point of the multimedia file 1000.

In an embodiment, the first time point can be calculated according to a following equation (1):

$$T1 = t \times \frac{A}{A+B} \tag{1}$$

Where, T1 is the first time point, t is a time length of the multimedia file (for example, the multimedia file 1000) to be downloaded, A is the first bandwidth information, and B is the second bandwidth information. For example, a unit of T1 and t is time, and a unit of A and B is bit number/time. By adaptively determining the first time point, when the electronic device 12 plays the multimedia file 1000 to the first time point, the multimedia file posterior to the first time point can be consecutively played, so as to decrease occurrence of latency.

It should be noticed that the amount of electronic devices from which the same multimedia file is downloaded is not limited by the invention. In the multimedia file download system, the amount of electronic devices capable synchronously sharing the multimedia file can be more.

Figure 3:
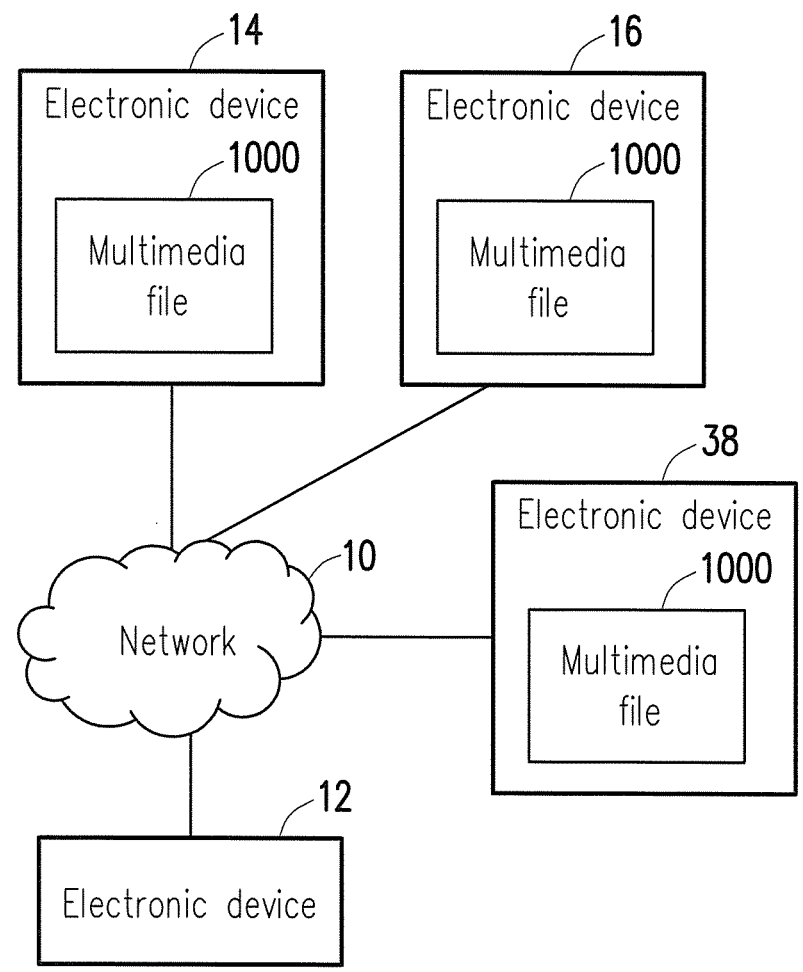
FIG. 3 is a schematic diagram of a multimedia file download system according to another embodiment of the invention.

FIG. 3 is a schematic diagram of a multimedia file download system according to another embodiment of the invention.

Referring to FIG. 3, the multimedia file download system 300 includes the network 10, the electronic device 12, the electronic device 14, the electronic device 16 and an electronic device 38. The electronic device 38 can be the same or similar to one of the electronic device 12, the electronic device 14 and the electronic device 16. The electronic device 12 may synchronously download the multimedia file 1000 from the electronic device 14, the electronic device 16 and the electronic device 38.

In the present embodiment, the electronic device 12 obtains respective bandwidth information of the electronic device 14, the electronic device 16 and the electronic device 38, and requests to respectively download a multimedia streaming of a specific time section in the multimedia file 1000 from the electronic device 14, the electronic device 16 and the electronic device 38 according to the obtained bandwidth information.

Figure 4:
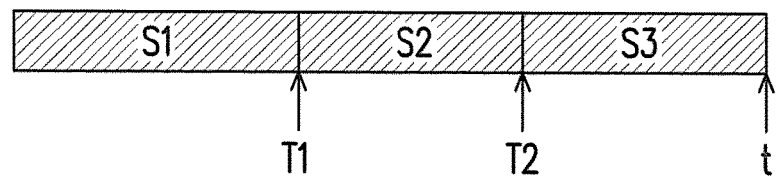
FIG. 4 is a schematic diagram of downloading a multimedia file in segments according to another embodiment of the invention.

FIG. 4 is a schematic diagram of downloading a multimedia file in segments according to another embodiment of the invention.

Referring to FIG. 4, when the electronic device 12 wants to download the multimedia file 1000, the electronic device 12 calculates time points T1 and T2 according to the bandwidth information of the electronic device 14, the electronic device 16 and the electronic device 38. For example, the time points T1 and T2 can be respectively calculated according to following equations (2) and (3):

$$T1 = t \times \frac{A}{A+B+C} \qquad (2)$$

$$T2 = t \times \frac{A}{A+B+C} + t \times \frac{B}{A+B+C} \qquad (3)$$

Where, T1 is the first time point, T2 is a second time point, t is a time length of the multimedia file 1000, A is the bandwidth information of the electronic device 14, B is the bandwidth information of the electronic device 16, and C is the bandwidth information of the electronic device 38 (which is also referred to as third bandwidth information hereinafter). However, in another embodiment, channel information and/or specification information of the electronic devices sharing the multimedia file can also serve as a reference for calculating the first time point and/or the second time point.

In the present embodiment, the electronic device 12 sends a first download request to the electronic device 14 to request downloading a multimedia streaming S1 prior to the time point T1 in the multimedia file 1000. The electronic device 12 sends a second download request to the electronic device 16 to request downloading a multimedia streaming S2 between the time point T1 and the time point T2 in the multimedia file 1000. The electronic device 12 sends another download request (which is also referred to as a third download request) to the electronic device 38 to request downloading a multimedia streaming S3 posterior to the time point T2 in the multimedia file 1000. In response to the received download requests, the electronic devices 14, 16 and 38 respectively transmit the corresponding multimedia streaming of the multimedia file 1000 to the electronic device 12.

Moreover, according to the amount of the electronic devices capable of sharing the same multimedia file in the multimedia file download system, more time points can be calculated, and the multiple segments of multimedia streamings between the time points in the multimedia file can be synchronously downloaded.

In another embodiment, the electronic device 12 may send a start download request corresponding to the multimedia file 1000 to any one of the electronic devices in the multimedia file download system 100 or 300, and the electronic device 12 may select an electronic device with the maximum bandwidth from the multiple source devices storing the multimedia file for downloading the first multimedia streaming in high priority. For example, in another embodiment of FIG. 1, according to the first bandwidth information and the second bandwidth information, if the electronic device 12 determines that a bandwidth of the electronic device 16 for downloading the multimedia file 1000 is larger than a bandwidth of the electronic device 14 for downloading the multimedia file 1000, even if the electronic device 14 serves as the cloud server in the multimedia file download system 100, the electric device 12 selects to download the first multimedia streaming from the electronic device 16 in high priority and synchronously downloads the second multimedia streaming from the electronic device 14.

In an embodiment, according to the obtained bandwidth information, the electronic device 12 may select to exclude one or a plurality of electronic devices with smaller bandwidths, and downloads the different parts of the same multimedia file from one or a plurality of electronic devices with larger bandwidths.

In an embodiment, after the electronic device 12 is booted, the electronic device 12 activates a file download function, the electronic device 12 registers to the electronic device 14 serving as the cloud server or the electronic device 12 connects to the network 10, the electronic device 12 may automatically search the other applicable electronic devices on the network 10. For example, the electronic devices connected to the same wired/wireless LAN may be found. After the other applicable electronic devices (for example, the electronic devices 14, 16 and 38) on the network 10 are found, the electronic device 12 automatically analyses the respective bandwidth information of the applicable electronic devices for subsequent usage of downloading the multimedia file.

In another embodiment, after the electronic device 12 is booted, the electronic device 12 activates the file download function, the electronic device 12 registers to the electronic device 14 serving as the cloud server or the electronic device 12 connects to the network 10, the electronic device 14 serving as the cloud server detects the electronic device 12, and then transmits a multimedia file list recording the multimedia file respectively stored or downloaded by one or a plurality of other applicable electronic devices to the electronic device 12 for subsequent usage of downloading the multimedia file.

In another embodiment, after the electronic device 12 is booted, the electronic device 12 activates the file download function, the electronic device 12 registers to the electronic device 14 serving as the cloud server or the electronic device 12 connects to the network 10, the electronic device 12 may request to download the multimedia file list from the electronic device 14 serving as the cloud server at any time point. Alternatively, the electronic device 12 may inquire any electronic device in the multimedia file download system 100 or 300 for the information of the multimedia file stored therein by itself for subsequent usage of downloading the multimedia file.

In an embodiment, the electronic device 12 may determine the aforementioned time points used for dividing the download sections of a multimedia file according to information related to the multimedia file 1000.

For example, in another embodiment of FIG. 1, the electronic device 12 may further obtain preloading time information of the multimedia file 1000 and frame rate information of the multimedia file 1000. These information related to the multimedia file 1000 can be obtained from the electronic device 14 in real time when the multimedia file 1000 is to be downloaded or can be obtained in advance, which is not limited by the invention. For example, a method for obtaining the information related to the multimedia file 1000 is the same or similar to the aforementioned method for obtaining the device information. The preloading time information refers to a time length of the multimedia streaming pre-downloaded to the electronic device 12 in the multimedia file 1000 when a certain part of the multimedia file 1000 is previously downloaded. The multimedia streaming pre-downloaded to the electronic device 12 can be played first, so as to prolong a time for downloading the other parts of multimedia streaming in background. For example, if the preloading time information indicates that a multimedia streaming with a time length of 5 seconds in the multimedia file 1000 has been downloaded to the electronic device 12, while the multimedia streaming with the time length of 5 seconds is played, the multimedia streaming posterior to the 5 seconds in the multimedia file 1000 can be downloaded to the electronic device 12 in background and consecutively played. Moreover, the frame rate information of the multimedia file 1000 indicates an amount of frames per second of a file format of the multimedia file 1000. In an embodiment, frame rate information of the multimedia file 1000 can be represented by a play bandwidth of the corresponding multimedia streaming. Thereafter, the electronic device 12 may determine one or a plurality of time points according to the bandwidth information of one or a plurality of source devices, the corresponding preloading time information and the frame rate information of the multimedia file 1000. In this way, the electronic device 12 may request the multimedia streamings of the corresponding time sections belonging to the multimedia file 1000 from the source devices according to the determined time points.

Figure 5:
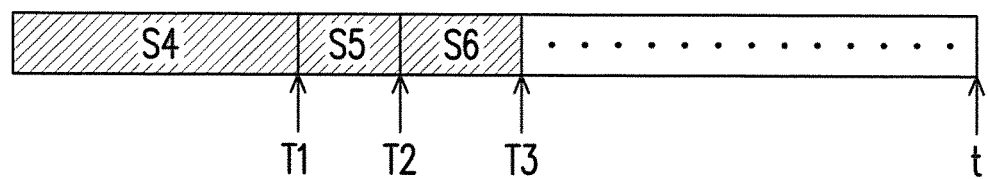
FIG. 5 is a schematic diagram of downloading a multimedia file in segments according to another embodiment of the invention.

FIG. 5 is a schematic diagram of downloading a multimedia file in segments according to another embodiment of the invention.

Referring to FIG. 1 and FIG. 5, it is assumed that the electronic device 12 wants to download the multimedia file 1000 from the electronic devices 14 and 16, the electronic device 12 divides the time length t of the multimedia file 1000 into a plurality of time sections according to at least the time points T1, T2 and T3 and sequentially downloads the multimedia streamings S4-S6 of the multimedia file 1000 in these time sections from the electronic devices 14 and 16 in an interleaving or alternation manner.

In the present embodiment, it is assumed that the electronic device 12 wants to download a multimedia streaming from the start time point of the multimedia file 1000 to the time point T1 in the multimedia file 1000 from the electronic device 14, the electronic device 12 may obtain bandwidth information (i.e. the first bandwidth information) of the electronic device 14, initial preloading time information (which is also referred to as first preloading time information hereinafter) of the multimedia file 1000 and the frame rate information of the multimedia file 1000. For example, it is assumed that when the multimedia streaming of the multimedia file 1000 is initially downloaded, the multimedia streaming with a time length of 5 seconds is previously downloaded to the electronic device 12, such that the first preloading time information is regarded as 5. The electronic device 12 may determine the time point T1 according to the first bandwidth information, the first preloading time information and the frame rate information of the multimedia file 1000. For example, the electronic device 12 may first calculate a pause time point (which is also referred to as a first pause time point). The first pause time point refers to a time point corresponding to a first play pause (e.g., delay) that is predicted based on the first bandwidth information, the first preloading time information and the frame rate information of the multimedia file 1000. The electronic device 12 may determine the time point T1 according to the first pause time point.

In the present embodiment, the electronic device 12 may obtain the first pause time point according to a following equation (4):

$$D1 = \frac{BT1 \times A}{VF - A} \quad (4)$$

Where, D1 is the first pause time point, BT1 is the first preloading time information, VF is the frame rate information of the multimedia file 1000. For example, it is assumed that BT1 is 5 seconds, A is 4 megabytes (MB), and VF is 8 MB, it can be calculated that $$D1 = \frac{5 \times 4}{8 - 4} = 5.$$

Namely, based on the preloaded multimedia streaming with the time length of 5 seconds, after a subsequent multimedia streaming with the time length of 5 seconds (i.e. the first pause time point D1) is downloaded and played (i.e. played to 10 second of the multimedia file 1000), a play pause (e.g., delay) is probably occurred. Therefore, the time point T1 can be set to 10 seconds (i.e. 5+5=10).

After the time point T1 is determined, in order to calculate the time length of the multimedia streaming S5 to be downloaded from the electronic device 16, the electronic device 12 may predict a next play pause according to the bandwidth information (i.e. the second bandwidth information) of the electronic device 16, another preloading time information (which is also referred to as second preloading time information hereinafter) and the frame rate information of the multimedia file 1000, and accordingly determines another pause time point (which is also referred to as a second pause time point hereinafter). Here, the second preloading time information can be set according to the time point T1. For example, during a process of downloading and playing the multimedia streaming S4 downloaded from the electronic device 14, the electronic device 12 may synchronously download the multimedia streaming posterior to the time point T1 in the multimedia file 1000 in background, so that the second preloading time information can be set to the time point T1. For example, the second preloading time information is set to 10 seconds.

In the present embodiment, the electronic device 12 may obtain the second pause time point according to a following equation (5):

$$D2 = \frac{BT2 \times B}{VF - B} \quad (5)$$

Where, D2 is the second pause time point, BT2 is the second preloading time information. For example, it is assumed that BT2 is 10, and B is 2 MB, it can be calculated that $$D2 = \frac{10 \times 2}{8 - 2} \times 3.333.$$

Namely, based on the preloaded multimedia streaming S4 with the time length of 10 seconds, within 3.333 seconds (i.e. the second pause time point D2) after the time point T1, the play pause is probably occurred again. Therefore, the time point T2 can be set to 13.333 seconds (i.e. 10+3.333=13.333).

After the time point T2 is determined, in order to calculate the time length of the multimedia streaming S6 to be downloaded from the electronic device 14, the electronic device 12 may predict a next play pause according to the bandwidth information (i.e. the first bandwidth information) of the electronic device 14, another preloading time information (which is also referred to as third preloading time information hereinafter) and the frame rate information of the multimedia file 1000, and accordingly determines another pause time point (which is also referred to as a third pause time point hereinafter). Here, the third preloading time information can be set according to a time length between the time point T1 and the time point T2. For example, during a process of downloading and playing the multimedia streaming S5 downloaded from the electronic device 16, the electronic device 12 may synchronously download the multimedia streaming posterior to the time point T2 in the multimedia file 1000 in background, so that the third preloading time information can be set to the time length between the time point T1 and the time point T2. For example, the third preloading time information may be set to 3.333 seconds.

In the present embodiment, the electronic device 12 may obtain the third pause time point according to a following equation (6):

$$D3 = \frac{BT3 \times A}{VF - A} \quad (6)$$

Where, D3 is the third pause time point, BT3 is the third preloading time information. For example, it is assumed that BT3 is 3.333, and A is 4 MB, it can be calculated that $$D3 = \frac{3.333 \times 4}{8 - 4} = 3.333.$$

Namely, based on the preloaded multimedia streaming S5 with the time length of 3.333 seconds, within 3.333 seconds (i.e. the third pause time point D3) after the time point T2, the play pause is probably occurred again. Therefore, the time point T3 can be set to 16.666 seconds (i.e. 13.333+3.333=16.666). Deduced by analogy, more time points within the time length t can be calculated.

The electronic device 12 may send corresponding download requests to the electronic devices 14 and 16 to request downloading the corresponding multimedia streamings. Taking the multimedia streamings S4-S6 of FIG. 5 as an example, the electronic device 12 may send at least one first download request to the electronic device 14 to request downloading the multimedia streaming S4 prior to the time point T1 in the multimedia file 1000 and the multimedia streaming S6 between the time point T2 and the time point T3 in the multimedia file 1000. Meanwhile, the electronic device 12 may send at least one second download request to the electronic device 16 to request downloading the multimedia streaming S5 between the time point T1 and the time point T2 in the multimedia file 1000.

In this way, by interleavingly/alternately downloading different segments (or parts) of the multimedia file 1000 from the electronic device 14 and the electronic device 16, even if the amount of the source devices used for downloading the multimedia file 1000 is limited, the user of the electronic device 12 is ensured to view the downloaded multimedia file 1000 without a play pause as much as possible.

Figure 6:
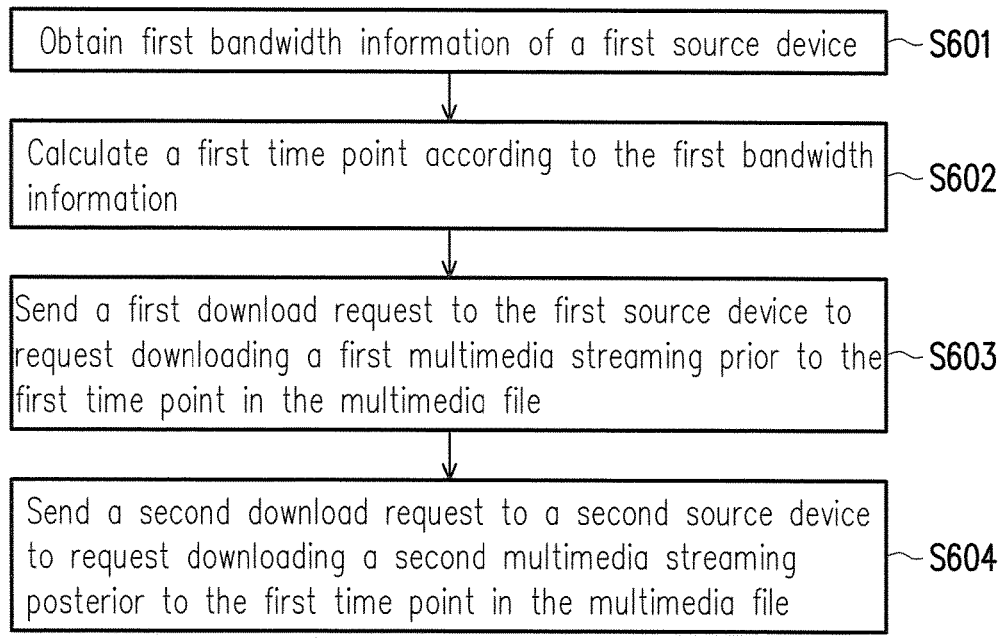
FIG. 6 is a flowchart illustrating a method for downloading a multimedia file according to an embodiment of the invention.

FIG. 6 is a flowchart illustrating a method for downloading a multimedia file according to an embodiment of the invention.

Referring to FIG. 6, in step S601, first bandwidth information of a first source device is obtained. In step S602, a first time point is calculated according to the first bandwidth information. In step S603, a first download request is sent to the first source device to request downloading a first multimedia streaming prior to the first time point in a multimedia file. In step S604, a second download request is sent to a second source device to request downloading a second multimedia streaming posterior to the first time point in the multimedia file. The steps S603 and S604 can be synchronously executed.

It should be noted that the flowchart of FIG. 6 can be executed in collaboration with the aforementioned embodiments or independently executed. Moreover, the various steps of FIG. 6 can be implemented by software modules or hardware circuits.

Figure 7:
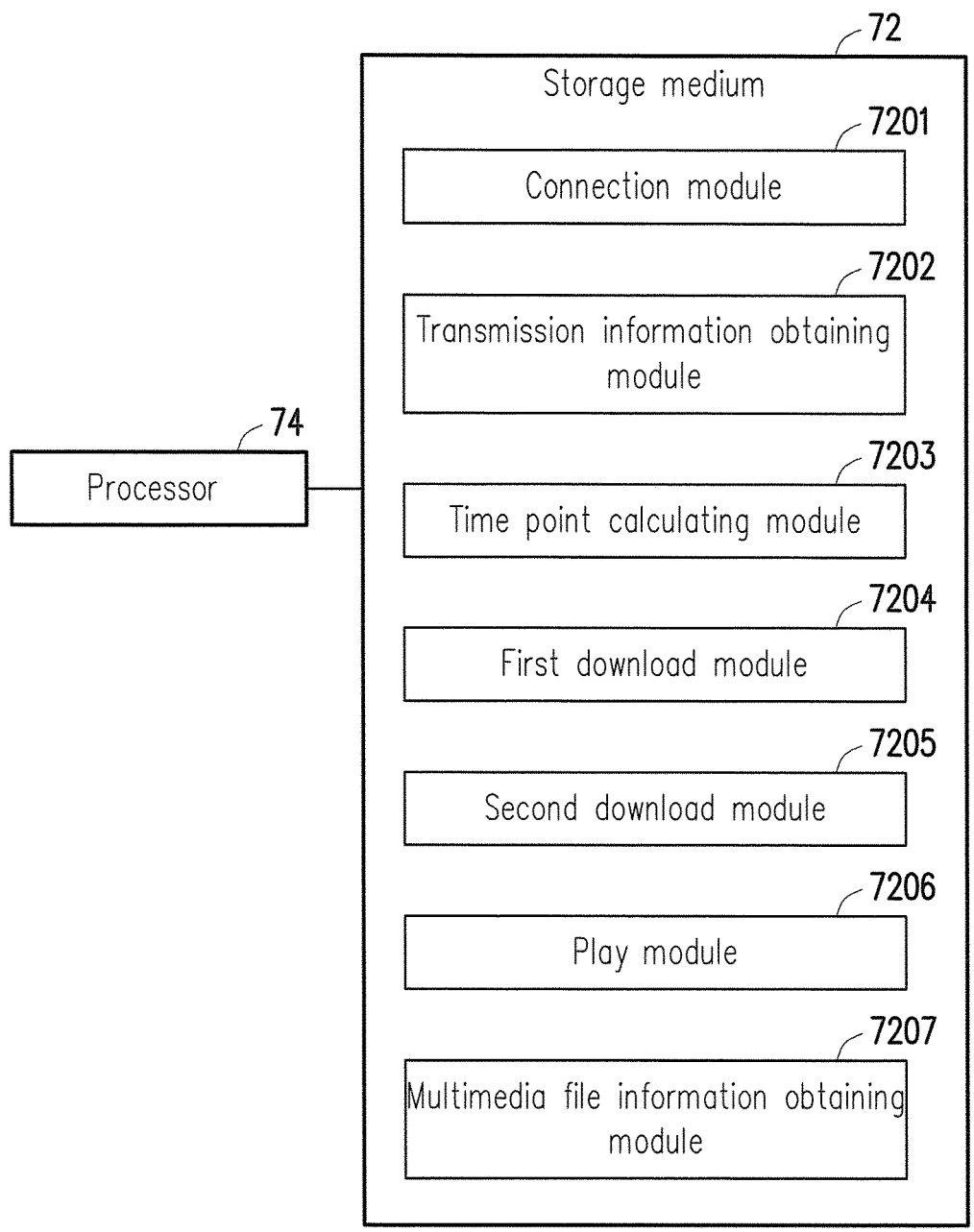
FIG. 7 is a schematic block diagram of an electronic device according to an embodiment of the invention.

FIG. 7 is a schematic block diagram of an electronic device according to an embodiment of the invention. In the present embodiment, the electronic device 12 of FIG. 1 is taken as an example for description. However, the structure introduced in the present embodiment can be applied to each of or a part of the electronic devices in the multimedia file download system 100 or 300.

Referring to FIG. 1 and FIG. 7, in the present embodiment, the electronic device 12 includes a storage medium 72 and a processor 74. The electronic device 12 may further include a display, an input/output (I/O) interface, a wired/wireless communication interface (for example, a network interface card), a power management device (for example, a battery), etc., which are not further described. For example, the processor 74 may connect to the network 10 through the wired/wireless transmission interface to transceive network packets; play images corresponding to a certain multimedia streaming through the display; receive operation commands/signals of the user through the I/O interface, etc.

The storage medium 72 stores a plurality of software or firmware modules. For example, the storage medium 72 may include a volatile memory, a non-volatile memory or a hard disk drive, etc., through the invention is not limited thereto. Moreover, the storage medium 72 can also be used for storing any file (for example, the multimedia file) and information (for example, the bandwidth information, etc.).

The processor 74 is electrically connected to the storage medium 72. The processor 74 may load and execute the modules stored in the storage medium 72 to implement various operations introduced in the aforementioned embodiments. For example, the processor 74 can be a central processing unit (CPU), a micro-processor or an embedded controller, through the invention is not limited thereto.

In the present embodiment, the storage medium 72 stores a connection module 7201, a transmission information obtaining module 7202, a time point calculating module 7203, a first download module 7204, a second download module 7205 and a play module 7206.

The connection module 7201 is used for connecting one or a plurality of source devices. The transmission information obtaining module 7202 is used for obtaining bandwidth information of the source devices. The time point calculating module 7203 is used for calculating one or a plurality of time points according to the obtained bandwidth information. The first download module 7204 is used for sending a download request to a certain source device to request downloading a multimedia streaming prior to a specific time point in a certain multimedia file. The second download module 7205 is used for sending another download request to another source device to request downloading a multimedia streaming posterior to the specific time point in the same multimedia file. The play module 7206 is used for playing the downloaded multimedia streamings.

Moreover, in another embodiment, the storage medium 72 may further store a multimedia file information obtaining module 7207. The multimedia file information obtaining module 7207 is used for obtaining the preloading time information of the multimedia file, the frame rate information of the multimedia file, etc.

Operation details of these modules may refer to descriptions of the aforementioned embodiments, and details thereof are not repeated.

It should be noted that in another embodiment, each of the modules shown in FIG. 7 can also be implemented in a manner of hardware circuit. For example, in another embodiment, the electronic device 12 may include a connection circuit, a transmission information obtaining circuit, a time point calculating circuit, at least one download circuit, a play circuit, etc., and theses circuits are electrically connected to each other to execute the aforementioned operations. For example, these circuits can be implemented in the processor 74 or independent to the processor 74 and electrically connected to the processor 74. According to the operation functions mentioned in the aforementioned embodiments, those skilled in the art should understand how to design the aforementioned software modules or hardware circuits.

In summary, at least one time point can be calculated according to transmission information of different electronic devices, and multimedia streamings of different time sections divided according to the at least one time point in a multimedia file may be synchronously downloaded from these electronic devices. When a part of the multimedia streamings of the multimedia file is downloaded and played, the invention may directly link up the different parts of multimedia streamings of the same multimedia file through the at least time point, so as to avoid occurrence of play latency.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for downloading a multimedia file, adapted to an electronic device, the method for downloading the multimedia file comprising:
    obtaining first bandwidth information of a first source device;
    calculating a first time point from a start time point of the multimedia file according to the first bandwidth information, comprising:
    obtaining first preloading time information of the multimedia file and frame rate information of the multimedia file;
    calculating first pause time information according to the first preloading time information, the frame rate information, and the first bandwidth information, wherein the first pause time information is a predicted play pause time point of the multimedia file; and
    determining the first time point according to the first preloading time information and the first pause time information;
    sending a first download request to the first source device to request downloading a first multimedia streaming from the start time point to the first time point in the multimedia file; and
    sending a second download request to a second source device to request downloading a second multimedia streaming from the first time point in the multimedia file.

2. The method for downloading the multimedia file as claimed in claim 1, further comprising:
    playing the first multimedia streaming; and
    playing, consecutively, the second multimedia streaming when play of the first multimedia streaming is completed.

3. The method for downloading the multimedia file as claimed in claim 1, further comprising:
    obtaining second bandwidth information of the second source device,
    wherein the step of calculating the first time point according to the first bandwidth information comprises:
    calculating the first time point according to the first bandwidth information and the second bandwidth information.

4. The method for downloading the multimedia file as claimed in claim 3, wherein the step of calculating the first time point according to the first bandwidth information and the second bandwidth information comprises:
    calculating the first time point according to the first bandwidth information, the second bandwidth information and a time length of the multimedia file.

5. The method for downloading the multimedia file as claimed in claim 1, further comprising:
    determining second preloading time information of the multimedia file according to the first time point; and
    calculating a second time point according to the second bandwidth information, comprising:
    obtaining second preloading time information of the multimedia file;
    calculating second pause time information according to the second preloading time information, the frame rate information, and the second bandwidth information; and
    determining the second time point according to the second preloading time information and the second pause time information;
    wherein the second download request is to request downloading the second multimedia streaming between the first time point and the second time point in the multimedia file.

6. An electronic device, comprising:
    a network interface card;
    a storage medium, configured to store a plurality of modules; and
    a processor, coupled to the storage medium and configured to load and execute the modules to implement following operations:
    connecting to a first source device and a second source device through the network interface card;
    obtaining first bandwidth information of the first source device;
    calculating a first time point from a start time point of the multimedia file according to the first bandwidth information, comprising:
    obtaining first preloading time information of the multimedia file and frame rate information of the multimedia file;
    calculating first pause time information according to the first preloading time information, the frame rate information, and the first bandwidth information, wherein the first pause time information is a predicted play pause time point of the multimedia file;

determining the first time point according to the first preloading time information and the first pause time information; and sending a first download request to the first source device through the network interface card to request downloading a first multimedia streaming from the start time point to the first time point in a multimedia file; and sending a second download request to the second source device through the network interface card to request downloading a second multimedia streaming from the first time point in the multimedia file.

7. The electronic device as claimed in claim 6, wherein the processor is further configured to play the first multimedia streaming and consecutively play the second multimedia streaming after completing playing the first multimedia streaming.

8. The electronic device as claimed in claim 6, wherein the processor is further configured to obtain second bandwidth information of the second source device,
wherein the operation that the processor calculates the first time point according to the first bandwidth information comprises:
calculating the first time point according to the first bandwidth information and the second bandwidth information.

9. The electronic device as claimed in claim 8, wherein the operation that the processor calculates the first time point according to the first bandwidth information and the second bandwidth information comprises:
calculating the first time point according to the first bandwidth information, the second bandwidth information and a time length of the multimedia file.

10. The electronic device as claimed in claim 6, wherein the processor is further configured to determine second preloading time information of the multimedia file according to the first time point,
wherein the processor is further configured to calculate a second time point according to the second bandwidth information, comprises:
obtaining second preloading time information of the multimedia file;
calculating second pause time information according to the second preloading time information, the frame rate information, and the second bandwidth information; and
determining the second time point according to the second preloading time information and the second pause time information;
wherein the second download request is to request downloading the second multimedia streaming between the first time point and the second time point in the multimedia file.

* * * * *